United States Patent [19]

Braun et al.

[11] Patent Number: 5,485,302

[45] Date of Patent: Jan. 16, 1996

[54] OPTICAL RECEIVER WITH SIGNAL SPLITTER

[75] Inventors: Klaus Braun; Ulrich Steigenberger, both of Stuttgart, Germany

[73] Assignee: Alcatel N.V., Amsterdam, Netherlands

[21] Appl. No.: 424,245

[22] Filed: Apr. 18, 1995

Related U.S. Application Data

[63] Continuation of Ser. No. 139,529, Oct. 20, 1993, abandoned.

[30] Foreign Application Priority Data

Oct. 20, 1992 [DE] Germany .................. 42 35 321.1

[51] Int. Cl.⁶ .................................................. H04B 10/06
[52] U.S. Cl. ............................ 359/189; 330/59; 330/126; 250/214 A
[58] Field of Search ....................... 330/59, 126, 308; 250/214 A, 551

[56] References Cited

U.S. PATENT DOCUMENTS

| | | | |
|---|---|---|---|
| 2,771,518 | 11/1956 | Sziklai | 333/132 |
| 3,956,717 | 5/1976 | Fisher et al. | 333/11 |
| 3,980,830 | 9/1976 | Wendland et al. | 348/397 |
| 4,435,850 | 3/1984 | Bowen et al. | 455/606 |
| 4,525,834 | 6/1985 | Schenkel et al. | 370/3 |
| 4,545,048 | 10/1985 | Hauk et al. | 370/1 |
| 4,885,747 | 12/1989 | Foglia | 370/123 |
| 5,008,524 | 4/1991 | Reutter et al. | 359/189 |
| 5,142,401 | 8/1992 | Shen et al. | 359/189 |
| 5,166,819 | 11/1992 | Eichel | 359/189 |
| 5,212,378 | 5/1993 | Uda | 359/189 |

FOREIGN PATENT DOCUMENTS

| | | |
|---|---|---|
| 622523 | 9/1990 | Australia . |
| 0177216 | 4/1986 | European Pat. Off. . |
| 0372742 | 6/1990 | European Pat. Off. . |
| 0485828 | 5/1992 | European Pat. Off. . |
| 3825006 | 1/1990 | Germany . |
| 61-25335 | 2/1986 | Japan . |
| 2222734 | 3/1990 | United Kingdom . |

OTHER PUBLICATIONS

"Lichtwellenleitertechnik" [Light Guide Technology] by Dieter Lutz, Publ. Pflaum Verlag Muenchen, 1986, pp. 279 to 289.

Jerry Sevick, "Transmission Line Transformers", Summer/Fall 1989, pp. 34–41, IEEE MTT-S Newsletter.

*Primary Examiner*—Hezron E. Williams
*Assistant Examiner*—Richard A. Moller
*Attorney, Agent, or Firm*—Frishauf, Holtz, Goodman, Langer & Chick

[57] ABSTRACT

An optical receiver receives a wideband input signal and separates the wideband input signal into at least a first narrowband signal ($FB_1$) and a second broadband signal ($FB_2$). A photodiode (3) receives the wideband input signal and generates a photo-current responsive to the wideband input signal. The photodiode has a first terminal (K) and a second terminal (A). First (1) and second (2) subcircuits respectively are coupled to receive the photo-current generated by the photodiode (3). The first subcircuit (1) includes an amplifier. The first narrowband signal ($FB_1$) and the second broadband signal ($FB_2$) are respectively separated from the wideband input signal with the first subcircuit (1) and the second subcircuit (2). The narrowband signal ($FB_1$) includes a digital (telephone) signal and the broadband signal ($FB_2$) includes a CATV signal which are both included in the wideband input signal.

18 Claims, 6 Drawing Sheets

OPTICAL RECEIVER WITH SIGNAL SPLITTER

This application is a Continuation of application Ser. No. 08/139,529, filed Oct. 20, 1993, now abandoned.

BACKGROUND OF THE INVENTION

1. Field of the Invention

The invention relates to an optical receiver which has a signal splitter.

2. Description of the Prior Art

Such optical receivers are known, for example, from "Lichtwellenleitertechnik" [Light Guide Technology] by Dieter Lutz, Publ. Pflaum Verlag München, 1986, pp. 279 to 289.

The amplifiers contained in such prior art receivers are preferably so-called transimpedance amplifiers, since they are usable for signals with a broad bandwidth and a broad dynamic range. Such prior art receivers are disadvantageous for analog signal transmission since they have non-linearities and poor harmonic properties. However, such prior art transimpedance amplifiers are particularly suited for digital signal transmission because the requirements regarding linearity and harmonic properties are reduced for digital signals.

An alternative receiving concept for analog signal transmission is disclosed in European Patent Application No. 0 372 742 A2. This concept utilizes a photodiode, a transformer and an amplifier as the optical receiver for signals with a broad bandwidth up into the UHF range. The photodiode and the transformer are series-connected in European Patent Application 03 72742 A2.

In some transmitting systems, the simultaneous transmission of an analog signal with a wide bandwidth, for example having therein both a broadband cable TV signal, and a narrowband digital signal, is desired.

In the following paragraphs, an input signal from an input source will be referred to as a wideband signal. The wideband signal includes, for example, a cable TV signal which will be referred to hereinbelow as a broadband signal (and also hereinafter referred to as a BB signal), and a digital signal which will be referred to hereinbelow as a narrowband signal (and also hereinafter referred to as an SB signal). It is intended to transmit all these signals simultaneously over a common light guide.

An optical transmission system with an optical receiver and a signal splitter downstream of the optical receiver is known in principle from European Patent Application EP-A2-0 386,482 (which corresponds to Australian Patent No. 622,523 published on Oct. 9, 1992).

EP-A2-0 386,482 includes an optical receiver of a known type therein. An optical input signal of the optical receiver in EP-A2-0 386,482 is transformed into an electrical signal. The electrical signal, which contains TV and telephone signals, is split into its two signal components in a signal splitter connected downstream of the optical receiver.

SUMMARY OF THE INVENTION

It is an object of the invention to provide a respective different optical receiver for the broadband (BB) and the narrowband (SB) signals.

It is another object of the present invention to provide an optical receiver which receives wideband optical signals and separates the wideband optical signals into at least a first narrowband digital signal and a second broadband analog signal which has a larger bandwidth than said narrowband signal.

It is another object of the present invention to provide an optical receiver which separates a wideband signal into a first narrowband signal ($FB_1$) and a second broad bandwidth (broadband) signal ($FB_2$) which has a broader bandwidth than the first narrowband signal. The first ($FB_1$) and second ($FB_2$) signals respectively include therein a narrowband digital signal and a broadband cable TV signal.

It is another object of the present invention to provide an optical receiver (4) for receiving a wideband input signal, and for separating said wideband input signal into at least a first narrowband signal ($FB_1$) and a second broadband (FB) signal ($FB_2$), comprising: a photodiode (3) for generating a photo-current responsive to said wideband input signal; said photodiode (3) having a first terminal (K) and a second terminal (A); first (1) and second (2) subcircuits respectively coupled to receive said photo-current generated by said photodiode (3); said first subcircuit (1) including an amplifier, and wherein: said first narrowband signal ($FB_1$) and said second broadband signal ($FB_2$) are respectively separable from said wideband input signal with said first subcircuit (1) and said second subcircuit (2)

One advantage of the invention is that each signal ($FB_1$ and $FB_2$) is received by means of a receiving concept which is most advantageous for it. It follows from this that each optical receiver can be optimized. For example, optimization can take place with respect to sensitivity.

The invention will now be described with reference to the drawings.

DETAILED DESCRIPTION

Figure 1:
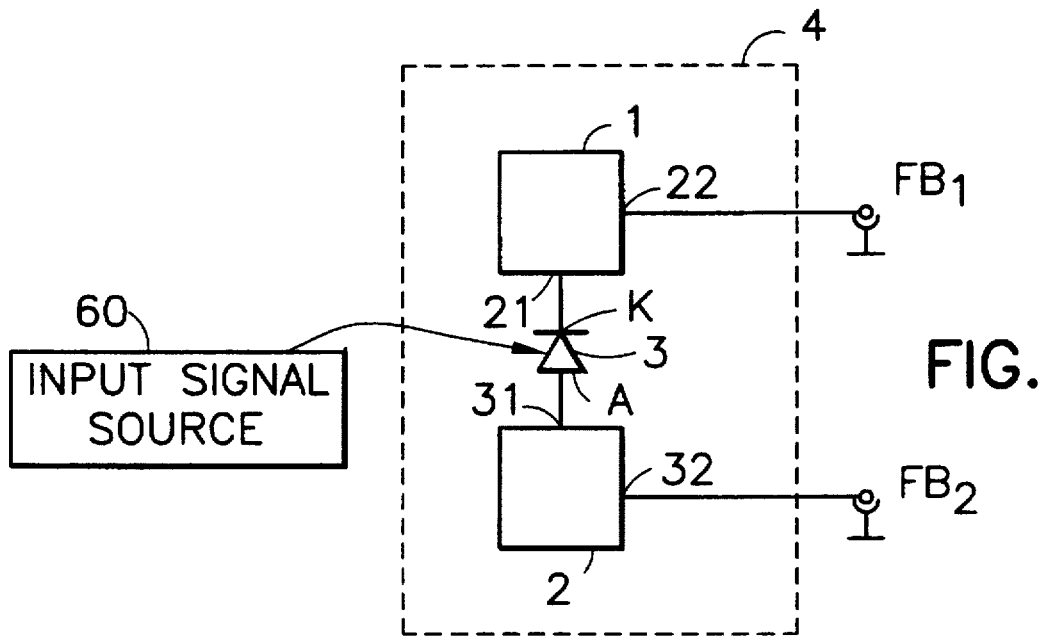
FIG. 1 is a basic circuit diagram of an optical receiver in accordance with the invention.

A basic circuit diagram of an optical receiver 4 is shown in FIG. 1. Optical receiver 4 contains a photodiode 3 which is connected to receive a wideband input signal that includes both a broadband signal (BB) and a narrowband signal (SB) from input signal source 60, a first subcircuit 1 and a second subcircuit 2. The first subcircuit 1 has an output 22, at which a first narrowband frequency signal $FB_1$ is available. A second broadband frequency signal $FB_2$ is available at an output 32 of the second subcircuit 2.

The photodiode 3, which provides a photo-current output signal which is a function of (for example, proportional to) the incident light, has a first terminal K (cathode) and a second terminal A (anode). A PIN photodiode or an avalanche photodiode (APD) can be employed. The latter has a current-intensifying effect.

In the basic circuit diagram of FIG. 1, the first subcircuit 1 is connected to the first terminal K of the photodiode 3 and the second subcircuit 2 has an input terminal 31 that is connected to the second terminal A of the photodiode.

The basic concept of the invention is that the entire information provided from input signal source 60 is contained in the photo-current, and that it is thus possible to separate the individual signals out of the wideband input signal before the separated signals are amplified. Thus, it is possible to separate a first narrowband frequency signal $FB_1$ with the aid of the first subcircuit 1 and a second broadband frequency signal $FB_2$ with the aid of the second subcircuit 2. In this way it is possible to filter out from the received wideband input signals from input signal source 60, the narrowband digital signal included in the first narrowband signals $FB_1$, and to filter out from the wideband input signals the broadband (BB) signal $FB_2$ included in the received wideband input signals. Accordingly, the subcircuits 1 and 2 are coupled serially to said photodiode such that the entire photo-current flows respectively through each of them.

Figure 1A:
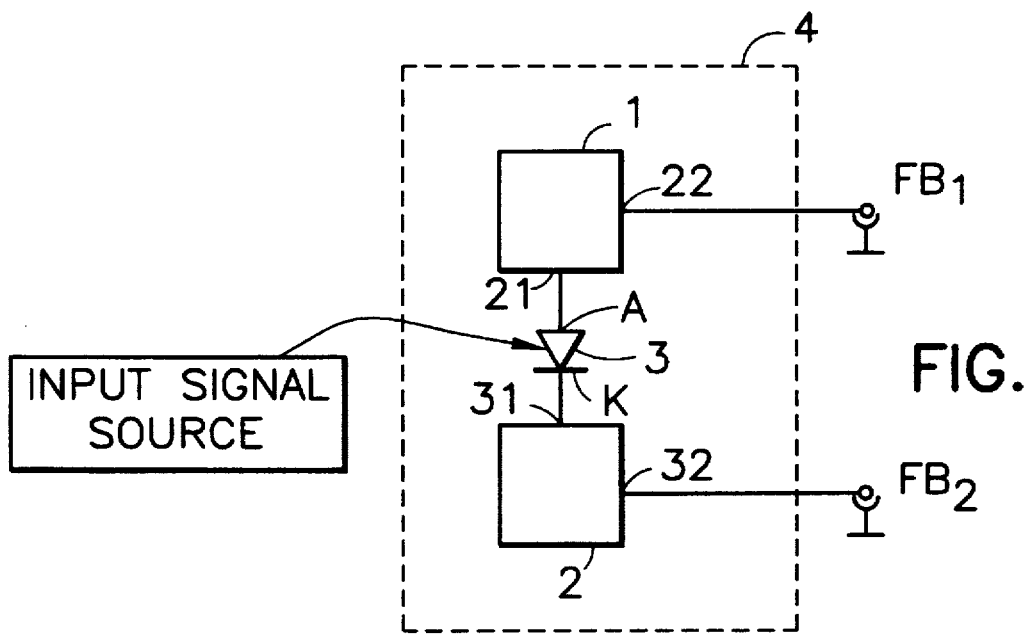
FIG. 1A is identical to FIG. 1 except that the polarity of photodiode 3 is reversed from FIG. 1.

An example of an alternate circuit arrangement is shown in FIG. 1A, wherein the second subcircuit 2 has an input terminal 31 that is connected to the first terminal K of the photodiode 3 and the first subcircuit 1 is connected to the second terminal A of photodiode 3.

Figure 5:
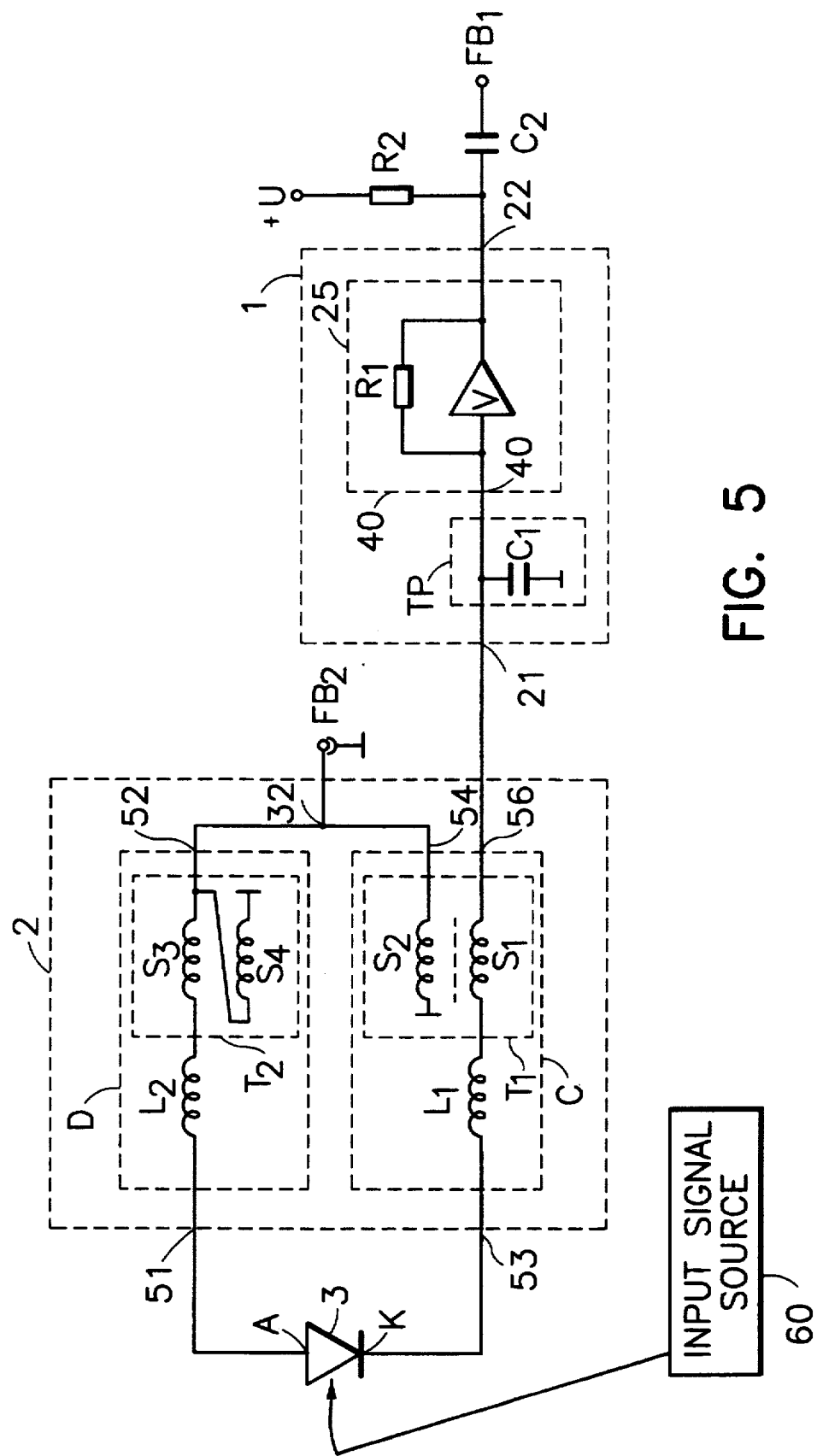
FIG. 5 is a still another embodiment of an optical receiver in accordance with the invention.
Figure 6:
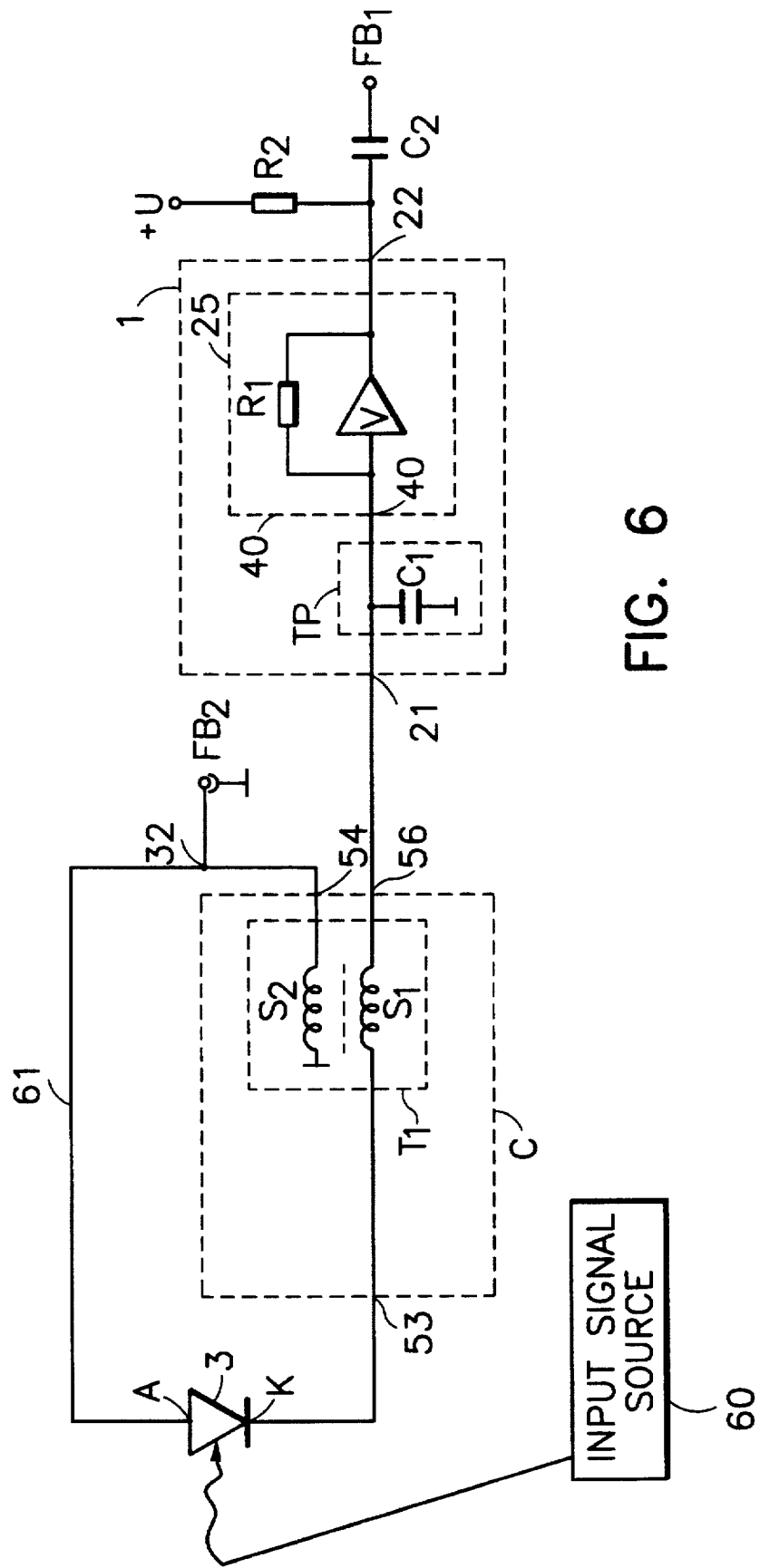
FIG. 6 is a further embodiment of an optical receiver in accordance with the invention.

Another alternate arrangement is shown in FIGS. 5 and 6 wherein the first subcircuit 1 is connected to the second subcircuit 2, and one of the two subcircuits (1 or 2) is connected to the first and second terminals (K and A) of photodiode 3. These alternate embodiments are described later hereinbelow.

Figure 2:
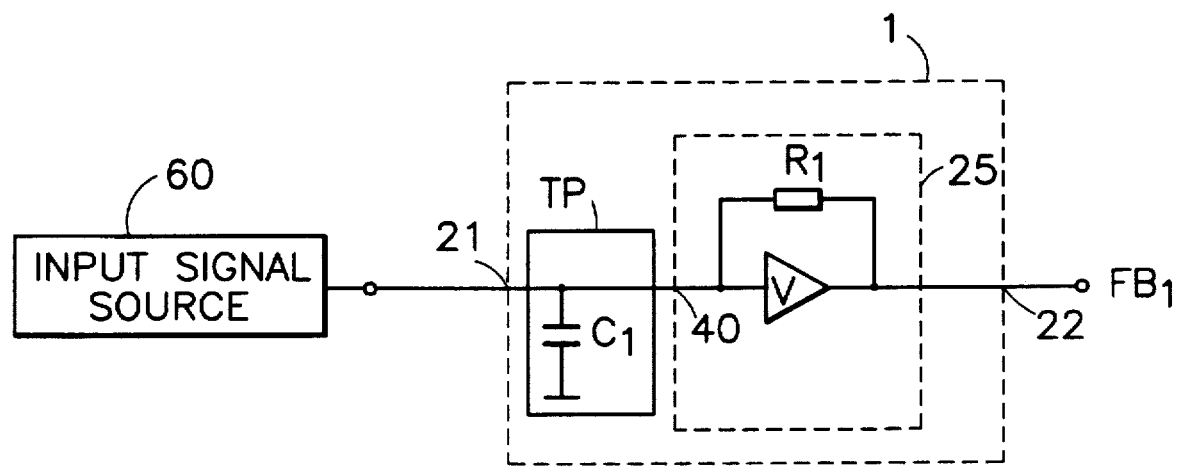
FIG. 2 is an embodiment of a first subcircuit.

An embodiment of the first subcircuit 1 is shown in FIG. 2. The first subcircuit 1 includes a low-pass filter TP having a capacitor $C_1$, an amplifier V and a feedback resistor $R_1$. The amplifier V with the feedback resistor $R_1$ is preferably formed as a transimpedance amplifier 25. However, a different amplification concept is possible, in the form of a low impedance amplifier. The subcircuit 1 has an input 21 and an output 22. The output 22 is also the output of the transimpedance amplifier 5. The transimpedance amplifier 25 has an input 40 connected to the output of the low-pass filter TP.

The capacitor $C_1$ is connected to ground at the input 21. The voltage supply for the amplifier V is not shown in the drawings. In this case the capacitor $C_1$ acts as low-pass filter for the SB signal since its threshold frequency is selected such that it separates the first narrowband frequency signal $FB_1$ from the input signal from input signal source 60. $C_1$ represents a short circuit for the BB (broadband) signal.

It is also possible to employ a higher order filter in place of this first order filter TP shown in FIG. 2. A possibly required further band limitation of the SB signal can take place downstream of the transimpedance amplifier 25, for example.

Figure 3:
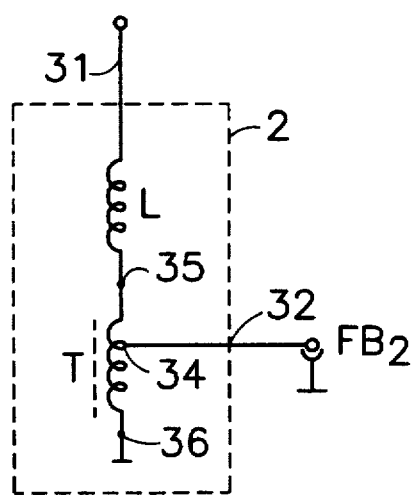
FIG. 3 is an embodiment of a second subcircuit.

An embodiment of the second subcircuit 2 is shown in FIG. 3. Second subcircuit 2 contains an inductance L and a transformer T, which are coupled to form an auto-transformer, for example. The subcircuit 2 has an input 31, connected to a first end of the inductance L, and an output 32 which is connected to a secondary pickup or output tap 34 of the transformer T.

A first connection 35 on the primary side of the transformer T is connected to a second end of the inductance L and a second connection 36 on the primary side of transformer T is connected to ground.

The subcircuit 2 contains at least one transformer T which is connected in such a way that the subcircuit 2 functions as a bandpass filter for the received signals.

Transformers basically function as bandpass-filters. The lower threshold frequency of a transformer is a function, for example, of the number of windings and the $A_L$ value (specific inductance) of the transformer and is determined by changing these parameters. The $A_L$ value is a characteristic constant for a coil which describes the permeability of the core material and the geometry of the coil, as follows:

$A_L = (\mu \cdot A)/l$, and the inductance of a coil is:

$L = A_L \cdot N^2$; and wherein

L: inductance; Vs/A $\mu$: permeability=$\mu_o \cdot \mu ri$ Vs/Am

A: area; $m^2$

N: number of windings l: length of the coil; m

A transformer transforms a current on the primary side into a current on the secondary side in accordance with the transformer ratio, so that no further amplifier is required.

The frequency response of the subcircuit 2 shown in FIG. 3 can be influenced by the inductance L.

The second broadband frequency signal $FB_2$ can be separated from the wideband input signals by means of the subcircuit 2.

Figure 4A:
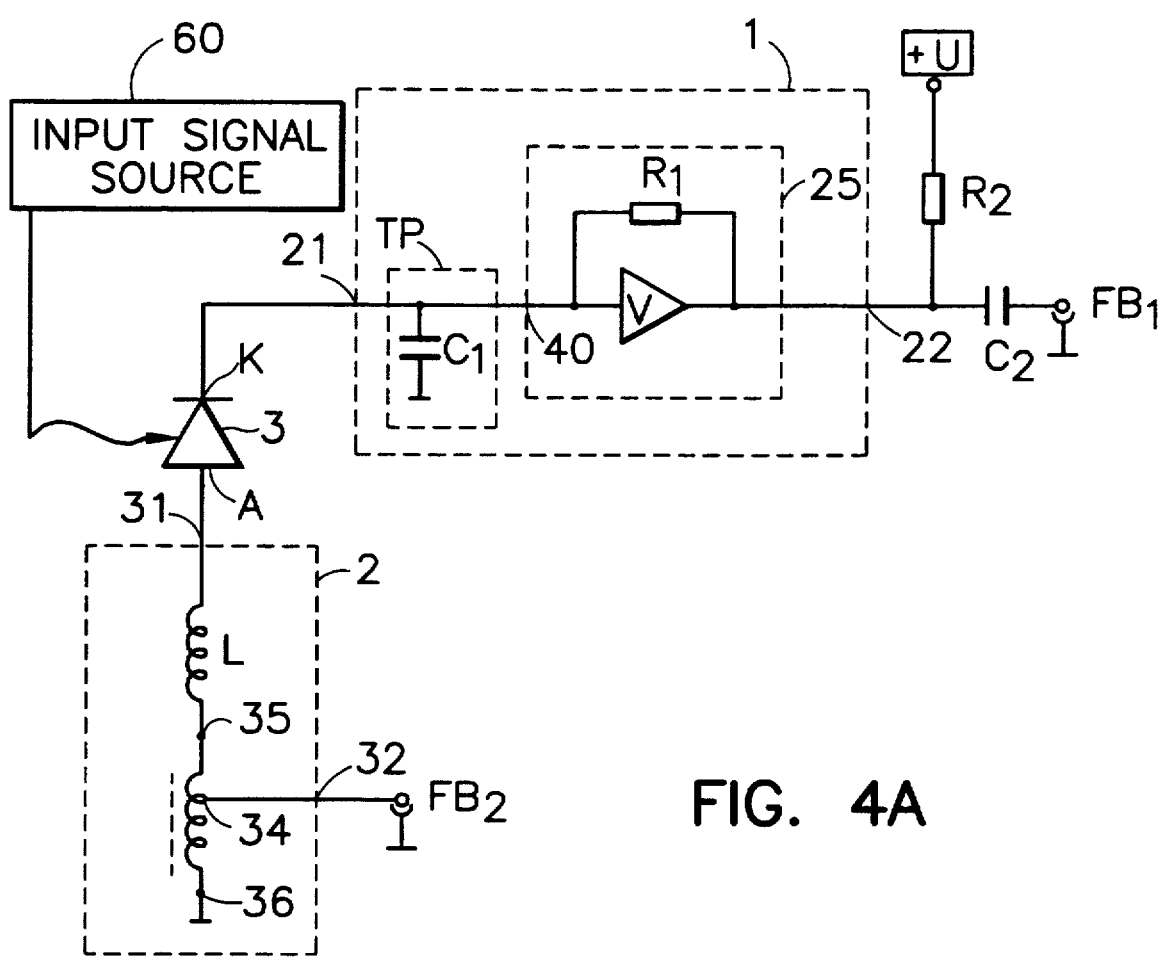
FIG. 4A is another embodiment of a optical receiver in accordance with the invention.

Another embodiment of the optical receiver in accordance with the invention is shown in FIG. 4A which corresponds to the basic circuitry of FIG. 1. The two subcircuits 1, 2 are shown in FIG. 4A and the reference numerals therein correspond to those of FIGS. 1–3. In FIG. 4A, a positive d.c. voltage supply from source U of the optical receiver is provided via a resistor $R_2$ that is connected to the output 22 of the first subcircuit 1. A series capacitor $C_2$ is also connected in series with the output 22, so that capacitor $C_2$ acts as a filter for the DC voltage from source U.

The photodiode 3 is operated with a blocked polarity because of the positive d.c. voltage from voltage source U (via resistor $R_2$, amplifier 25, low pass filter TP and input terminal 21) that is present at the terminal K of the photodiode 3.

Figure 4B:
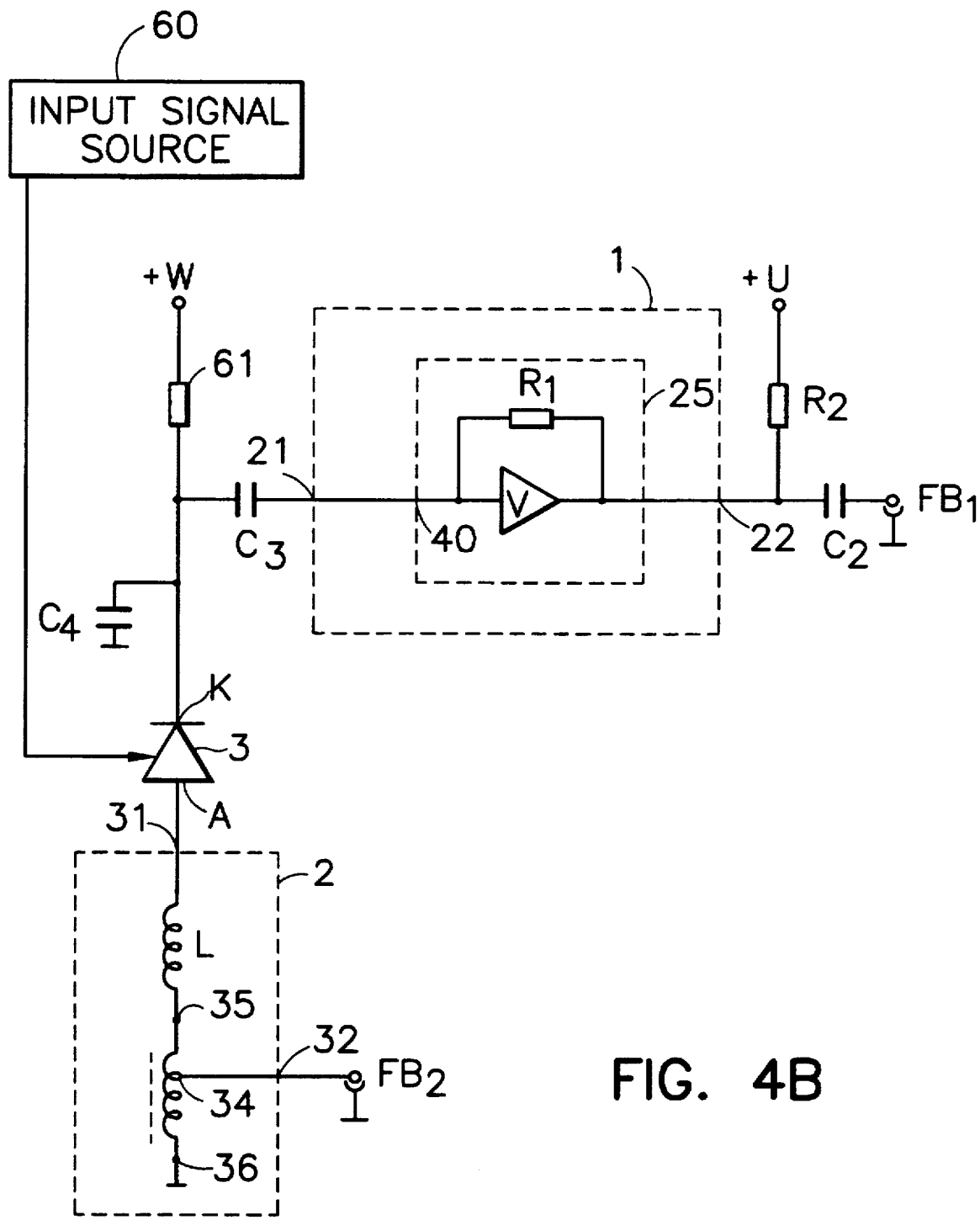
FIG. 4B is another embodiment of the receiver shown in FIG. 4A.

The following remarks are made with regard to the d.c. voltage supply of the photodiode:

FIG. 4B shows an alternative circuit arrangement to the aforementioned voltage supply from source U (shown in FIG. 4A). In FIG. 4B, the first terminal K of the photodiode 3 is connected to the d.c. voltage source W via a resistor or an inductor 61. In this case it is necessary to insert a series capacitor $C_3$ between voltage source W and the transimpedance amplifier 25 to filter out the d.c. voltage. The capacitor $C_4$ in FIG. 4B is connected between ground and terminal K of photodiode (3) and functions in the same manner as capacitor $C_1$ functions in FIG. 2 to filter out the DC voltage.

Another embodiment of an optical receiver in accordance with the invention is shown in FIG. 5.

FIG. 5 differs from FIGS. 1–4 in that the subcircuit 2 of FIGS. 1–4 includes a first circuit block C and a second circuit block B. The basic concept of the invention is retained, regardless of this division, because here, too, the entire photocurrent flows through the individual subcircuits 1 and 2 (wherein subcircuit 2 includes circuit blocks C and B). The first circuit block C includes an inductance $L_1$, a transformer $T_1$, an input 53, a first output 56 and a second output 54. The second circuit block B includes an inductance $L_2$ a transformer $T_2$, an input 51 and an output 52. The transformer $T_1$ has a first transformer winding $S_1$ and a second transformer winding $S_2$. The first transformer winding $S_1$ is connected to the inductance $L_1$ and to the output 56 of circuit block C. One end of the second transformer winding $S_2$ is connected to ground and the other end of winding $S_2$ is connected to the output 54 of the circuit block C.

One end of the inductance $L_1$ is connected to the winding $S_1$ of transformer $T_1$, and the other end of inductance $L_1$ is connected to the first terminal K of the photodiode 3.

The transformer $T_2$ of circuit block B is, for example, constructed as a so-called Ruthroff transformer and has two transformer windings $S_3$ and $S_4$ which are connected in series. Here, one end of the transformer winding $S_3$ is connected to the inductance $L_2$, the other end of winding $S_3$ is connected to the transformer winding $S_4$ and to the output 52 of the second circuit block B. The second end of the transformer winding $S_4$ is connected to ground. The two transformer windings $S_3$ and $S_4$ are magnetically coupled via a core (not shown) and wound in the same direction. The Ruthroff transformer is fully described in an article by Jerry Seviok, published in IEEE, MTT-S Newsletter Summer/Fall 1989 pages 34–41, the entire contents of which are incorporated herein by reference. Another end of the inductance $L_2$ is connected to the input 31 of the subcircuit 2 or 51 of circuit block B, and the latter is connected to the second terminal A of the photodiode 3.

The output 56 of the first circuit block C is connected to the input 21 of the first subcircuit 1. The first narrowband signal $FB_1$ is available downstream of the first subcircuit 1.

A voltage supply + U is provided via resistor $R_2$ in the same manner as described in connection with FIG. 4.

A further embodiment of the invention is shown in FIG. 6. FIG. 6 represents a simplification of the embodiment of FIG. 5. In FIG. 6, the block B of FIG. 5 is replaced by a through-connection 61. The inductance $L_1$ and the transformer $T_2$ of circuit block C in FIG. 5 are omitted. The remainder of the circuit in FIG. 6 is identical to FIG. 5.

In FIGS. 5 and 6, the transformers contained in the circuit blocks C and B are connected in such a way that they have a bandpass-filter function for the signals received from input signal source 60.

The optical receiver of the invention is intended for the reception of analog signals having a bandwidth of 40 to 860 MHz and, for example, for receiving digital signals having a bandwidth of approximately 30 MHz, but is not limited to these frequency ranges.

Various changes and modifications may be made, and features described in connection with any one of the embodiments may be used with any of the others, within the scope of the inventive concept.

We claim:

1. An optical receiver (4) for receiving a wideband input signal, and for separating the wideband input signal into at least a first narrowband signal and a second broadband signal that has a narrower frequency band than the wideband input signal, comprising:

a photodiode (3) for generating a photo-current having therein a first narrowband signal component ($FB_1$), a second broadband signal component ($FB_2$), and a wideband signal component respectively corresponding to said first narrowband signal, said second broadband signal and the wideband input signal, said photodiode generating said photo-current responsive to the wideband input signal;

said photodiode having a first terminal (K) and a second terminal (A);

first (1) and second (2) subcircuits respectively being coupled serially to said photodiode with said first subcircuit (1) being connected to one of said first and second terminals and said second subcircuit being connected to the other of said first and second terminals, so that each of said subcircuits receive an entirety of said photo-current generated by said photodiode (3), said first and second subcircuits respectively including signal separation means therein for separating the first narrowband signal component ($FB_1$) and the second broadband signal component ($FB_2$) from the wideband input signal component in said photo-current;

said first subcircuit (1) including an amplifier, and wherein:

said first narrowband signal component ($FB_1$) and said second broadband signal component ($FB_2$) are respectively separated by said separation means from said wideband input signal component in said photo-current by said first subcircuit (1), and by said second subcircuit (2), respectively, before said wideband input signal component in said photo-current is amplified in said first subcircuit (1) of said optical receiver, whereby said first narrowband signal component ($FB_1$) and said second broadband signal component ($FB_2$) are not commonly amplified in the optical receiver before said respective separation means separates said first narrowband signal component and said second broadband signal component from said photo-current, thereby enabling optimization of said separation means.

2. An optical receiver as claimed in claim 1, wherein:

said signal separation means in said first subcircuit includes a low-pass filter (TP) for separating said first narrowband signal component ($FB_1$) from said photo-current and said signal separation means in said second subcircuit includes at least one transformer (T) that is connected in said second subcircuit such that said second subcircuit functions as a broadband filter for separating said broadband signal component ($FB_2$) from said photo-current.

3. An optical receiver as claimed in claim 2, wherein:

said signal separation means of said second subcircuit (2) includes:
   a first circuit block (C) and a second circuit block (B); and first and second transformers ($T_1$, $T_2$) respectively included in said first and second circuit blocks (C, B);

said first transformer ($T_1$) having a first transformer winding ($S_1$) coupled to said first terminal (K) of said photodiode (3) and a second transformer winding ($S_2$) coupled to said second terminal (A) of said photodiode (3) via said second transformer (T) of said second circuit block (B); and said second transformer ($T_2$) is connected in said second circuit block (B) such that said second circuit block (B) functions as a broadband filter for filtering the broadband signal component from the photo-current.

4. An optical receiver as claimed in claim 3, wherein:

said second transformer $T_2$ includes a third ($S_3$) and a fourth ($S_4$) transformer winding connected in series with each other; and said third transformer winding ($S_3$) is coupled to said second terminal (A) of said photodiode (3) and to said second transformer winding ($S_2$) of said first transformer ($T_1$) of said first circuit block (C).

5. An optical receiver as claimed in claim 2, wherein:

said at least one transformer (T) included in said second subcircuit (2) comprises:
  a first transformer winding ($S_1$) coupled to said first terminal (K) of said photodiode (3); and
  a second transformer winding ($S_2$) coupled to said second terminal (A) of said photodiode (3), such that said signal separation means of second subcircuit (2) functions as a broadband filter for separating the broadband signal component from the photo-current.

6. An optical receiver as claimed in claim 1, wherein:
said first subcircuit (1) is connected to said first terminal (K) of said photodiode (3); and
said second subcircuit (2) is connected to said second terminal (A) of said photodiode (3).

7. An optical receiver as claimed in claim 1, wherein:
said first terminal (K) of said photodiode comprises a cathode terminal, and said second terminal (A) of said photodiode comprises an anode terminal.

8. An optical receiver as claimed in claim 1, wherein:
said second subcircuit (2) is connected to said first terminal (K) of said photodiodes (3); and
said first subcircuit (1) is connected to said second terminal (A) of said photodiode (3).

9. An optical receiver as claimed in claim 8, wherein:
said first terminal (K) of said photodiode comprises a cathode terminal, and said second terminal (A) of said photodiode comprises an anode terminal.

10. An optical receiver as claimed in claim 1, wherein:
said first subcircuit (1) is connected to said second subcircuit (2); and
one of said first and second subcircuits is connected to one of said first terminal (K) and said second terminal (A) of said photodiode (3).

11. An optical receiver as claimed in claim 10, wherein:
said first terminal (K) of said photodiode comprises a cathode terminal, and said second terminal (A) of said photodiode comprises an anode terminal.

12. An optical receiver as claimed in claim 1, wherein:
said signal separation means of said second subcircuit (2) includes:
  a first circuit block (C) and a second circuit block (B);
  first and second transformers ($T_1$, $T_2$) respectively included in said first and second circuit blocks (C, B);
  said first transformer ($T_1$) having a first transformer winding ($S_1$) coupled to said first terminal (K) of said photodiode (3) and a second transformer winding ($S_2$) coupled to said second terminal (A) of said photodiode (3) via said second transformer ($T_2$) of said second circuit block (B); and
  said second transformer ($T_2$) is connected in said second circuit block (B) such that said signal seperation means in said second subcircuit (2) functions as a broadband filter for filtering the broadband signal component from the photo-current.

13. An optical receiver as claimed in claim 12, wherein:
said first terminal (K) of said photodiode comprises a cathode terminal, and said second terminal (A) of said photodiode comprises an anode terminal.

14. An optical receiver as claimed in claim 12, wherein:
said second transformer $T_2$ includes a third ($S_3$) and a fourth ($S_4$) transformer winding coupled in series to each other in said second circuit block (B); and
said third transformer winding ($S_3$) is coupled to said second terminal (A) of said photodiode (3) and to said second transformer winding ($S_2$) of said first transformer ($T_1$) of said first circuit block (C).

15. The optical receiver as claimed in claim 1, further comprising
a DC voltage source (V) connected to an output (22) of said first subcircuit (1) via a resistor ($R_2$).

16. The optical receiver as claimed in claim 1, further comprising
a DC voltage source (W) connected to said first terminal (K) of said photodiode (3).

17. The optical receiver as claimed in claim 16, wherein:
a capacitor ($C_3$) is connected between said voltage source (W) and said first subcircuit (1).

18. The optical receiver as claimed in claim 17, wherein:
another capacitor ($C_4$) is connected between a ground and said first input terminal (K) of said photodiode (3).

* * * * *